(12) United States Patent
Mercado et al.

(10) Patent No.: US 7,192,999 B2
(45) Date of Patent: Mar. 20, 2007

(54) POLYIMIDES FOR USE AS HIGH REFRACTIVE INDEX, THIN FILM MATERIALS

(75) Inventors: Ramil-Marcelo L. Mercado, Rolla, MO (US); William L. DiMenna, University Heights, OH (US)

(73) Assignee: Brewer Science Inc., Rolla, MO (US)

( * ) Notice: Subject to any disclaimer, the term of this patent is extended or adjusted under 35 U.S.C. 154(b) by 48 days.

(21) Appl. No.: 10/932,792

(22) Filed: Sep. 2, 2004

(65) Prior Publication Data
US 2005/0065278 A1    Mar. 24, 2005

Related U.S. Application Data

(60) Provisional application No. 60/504,656, filed on Sep. 19, 2003.

(51) Int. Cl.
    *C08K 5/15*    (2006.01)
(52) U.S. Cl. .................. 524/111; 524/113; 524/360
(58) Field of Classification Search ............... 524/111, 524/113, 360, 609, 612
    See application file for complete search history.

(56) References Cited

U.S. PATENT DOCUMENTS

| | | |
|---|---|---|
| 4,710,557 A | 12/1987 | Warren |
| 5,132,430 A | 7/1992 | Gaudiana et al. |
| 5,214,116 A | 5/1993 | Matsuoka et al. |
| 5,386,002 A | 1/1995 | Inbasekaran et al. |
| 6,232,428 B1 | 5/2001 | Deets et al. |
| 6,288,210 B1 | 9/2001 | Shobha et al. |
| 6,300,464 B2 | 10/2001 | Morijiri et al. |
| 6,320,020 B1 | 11/2001 | Takuma et al. |
| 6,389,215 B1 | 5/2002 | Lindsay et al. |

FOREIGN PATENT DOCUMENTS

| | | |
|---|---|---|
| JP | 02-283705 A2 | 11/1990 |
| JP | 05-271257 A2 | 10/1993 |
| JP | 2005-015790 | 1/2005 |

OTHER PUBLICATIONS

Arch Micro, Durimide product information, 2002.
Beecroft, L.L., and C.K. Ober, "High refractive index polymers for optical applications," *Journal of Macromolecular Science, A* 3(4), 1997, 573-586.
Chang, C.C., and W.C. Chen, "High-Refractive-Index Thin Films Prepared from Aminoalkoxysilane-Capped Pyromellitic Dianhydride-Titania Hybrid Materials," *Journal of Polymer Science, Part A: Polymer Chemistry*, 39, 2001, 3419.
Chen, W.C., L.H. Lee, B.F. Chen, and C.T. Yen, "Synthesis and characterization of poly(methyl silsesquioxane) titania optical thin films," *Journal of Materials Chemistry*, 12, 2002, 3644-3648.
Chen, W.C., S.J. Lee, L. H. Lee, and J.L. Lin, "Synthesis and characterization of trialkoxysilane-capped poly(methyl methacrylate)-titania hybrid optical thin films," *Journal of Materials Chemistry*,9, 1999, 2999-3003.
DuPont, Kapton HN Product information, 2003.
Eichstadt, A.E., T.C. Ward, M.D. Bagwell, I.V. Farr, D.L. Dunson, and J.E. McGrath, "Synthesis and Characterization of Amorphous Partially Aliphatic Polyimide Copolymers Based on Bisphenol-A Dianhydride," *Macromolecules, 35*, 2002, 7561-7568.
Feger, C., M. Khojasteh, and J.E. McGarth, eds., *Polyimides: Materials, Chemistry and Characterization*, New York: Elsevier Science Science Publishing Co., 1989.
Hasegawa, M., and K. Horie, "Photophysics, photochemistry, and optical properties of polyimides," *Progress in Polymer Science*, 26 2001, 259-335.

(Continued)

*Primary Examiner*—Edward J. Cain
(74) *Attorney, Agent, or Firm*—Hovey Williams LLP

(57) ABSTRACT

New compositions for use as high refractive index layers are provided. The compositions comprise a polyimide dispersed or dissolved in a solvent system. The polyimide can be prepared from commercially available dianhydrides and diamines. Preferred polymer include recurring monomers selected from the group consisting of

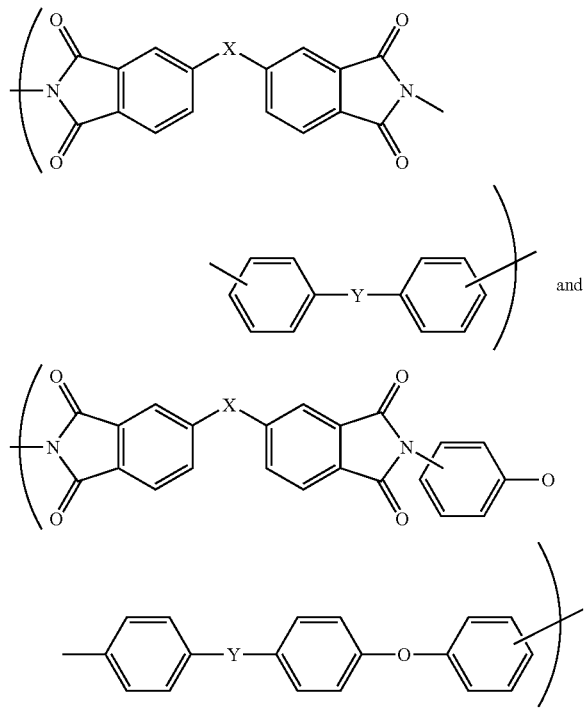

The inventive compositions can form strong, thin films and have high refractive indices making them useful in a wide range of optical applications.

52 Claims, 2 Drawing Sheets

OTHER PUBLICATIONS

Krause, B.; G.H. Koops, N.F.A. van der Vegt, M. Wessling, M. Wübbenhorst, and J. van Turnhout, "Novel Thim Film Polymer Foaming Technique for Low and Ultra Low-k Dielectrics," *Proceedings of the 7th International Conference on Solid Dielectrics*, Eindhoven, IEEE, Jun. 25-29, 2001.

Lee, L.H., and W.C. Chen, "High-Refractive-Index Thin Films Prepared from Trialkoxysilane-Capped Poly(methyl methacrylate)-Titania Materials," *Chemistry of Materials*, 13, 2001, 1137-1142.

Matsumoto, T. "Nonaromatic Polyimides Derived from Cycloaliphatic Monomers," *Macromolecules, 32* 1999, 4933-4939.

Mittal, K.L., ed., *Polyimides: Synthesis, Characterization, and Applications, vols. 1 and 2*, New York: Plenum Press, 1984.

Rasmussen, W. L. C., *Novel Carbazole Based Methacrylates, Acrylates, and Dimethacrylates to Produce High Refractive Index Polymers*, Ph.D. thesis, Virginia Polytechnic University, 2001.

Seferis, J. C., "Refractive Indices of Polymers" in J. Brandrup, E.H. Immergut, and E.A. Grulke, eds., *Polymer Handbook*, 4th ed., New York: Wiley, *VI*, 1999, 571.

Simpson, J.O., and A.K. St. Clair, "Fundamental Insight on Developing Low Dielectric Constant Polyimides," internal publication published online, NASA Langley Research Center, Hampton, VA, 1997.

Vantico, Matrimid 5218/Matrimid 9725 product literature, 2002.

Wang, B., and G.L. Wilkes, "New Ti-PTMO and Tr-PTMO Ceramer Hybrid Materials Prepared by the Sol-Gel Method: Synthesis and Characterization," *Journal of Polymer Science, Part A: Polymer Chemistry, 29*, 1991, 905-909.

Wang, B.; G.L. Wilkes, J.C. Hedrick, S.C. Liptak, and J.E. McGarth, "New high-refractive-index organic/inorganic hybrid materials from sol-gel processing," *Macromolecules, 24*, 1991a, 3449-3450.

Wang, B.; G.L. Wilkes; C.D. Smith, and J.E. McGarth, "High Refractive Index Hybrid Ceramer Materials Prepared from Titanium Tetraisopropoxide and poly(arylene ether phosphine oxide) Through Sol-Gel Processing," *Polymer Communications, 32* 1991b, 400-402.

Watanabe, Y., Y. Sakai, Y. Shibasaki, S. Ando, M. Ueda, Y. Oishi, and K. Mori,. "Synthesis of Wholly Alicyclic Polyimides from N-Silylated Alicyclic Diamines and Alicyclic Dianhydrides," *Macromolecules*, 35, 2002, 2277-2281.

POLYIMIDES FOR USE AS HIGH REFRACTIVE INDEX, THIN FILM MATERIALS

RELATED APPLICATIONS

This application claims the priority benefit of a provisional application entitled POLYIMIDES FOR USE AS HIGH REFRACTIVE INDEX, THIN FILM MATERIALS, Ser. No. 60/504,656, filed Sep. 19, 2003, incorporated by reference herein.

BACKGROUND OF THE INVENTION

1. Field of the Invention

The invention described herein relates to polyimide compositions that are useful as high refractive index materials. These compositions have good solubility (>10% w/w) in suitable solvent systems, high molecular weights, good film strengths, high transparencies in the visible and near-infrared region, and exceptional refractive indices.

2. Description of the Prior Art

High refractive index coatings increase the operating performance of many optoelectronic devices. For example, the efficiency of light-emitting diodes (LEDs) is improved by applying a layer of high refractive index material between the device and the encapsulating material.

Many organic polymer systems offer high optical transparency and ease of processing but seldom provide high refractive indices. The typical use of high refractive index organic polymers has been for ophthalmic lens manufacture. Among these polymers are bisphenol A polycarbonate with a refractive index of 1.58, polyphosphonates with refractive index values of 1.58 to 1.64, some novel acrylate and methacrylate polymers with reported refractive indices from 1.53 to 1.63, and sulfur-containing polymers with refractive indices ranging from 1.61 to 1.71.

A different approach to the formation of high refractive index film materials has been through the incorporation of inorganic compounds into polymer systems, resulting in hybrid materials. Various titanium dioxide (titania) hybrid materials have been reported in the literature, with refractive indices ranging from 1.505 to 1.867. However, formation of the inorganic component is accomplished by the sol-gel route, which usually necessitates the addition of water and the utilization of high temperatures (i.e., higher than 300° C.) for the proper formation of the titania nanoparticles. Other potential problems include the occurrence of microphase and macrophase separation, leading to optical loss and the inability to form relatively thick films.

Polyimides have been used extensively in microelectronics because they possess many desirable properties such as thermal stability, oxidative stability, high mechanical strength, and excellent solvent resistance. However, these same properties also give rise to problems such as difficulty in processing and manufacturing, as well as extreme insolubility in common organic solvents. Among the interests in polyimide use for microelectronics applications has been as interlayer dielectric materials. For this application, the desire has been to achieve lower dielectric constants in order to increase device efficiency by reducing signal distortion from capacitive coupling and crosstalk. Because dielectric constant and refractive index are exponentially related (the approximate relationship from the modified Maxwell equation: $\epsilon \sim 1.10\, n^2$, where $\epsilon$ is the dielectric constant and n is the refractive index), the reduction in dielectric constant values results in small decreases in the refractive index. The reduction of polyimide dielectric constants has been accomplished by various synthetic approaches such as the use of semiaromatic, aliphatic, and fluorinated dianhydrides and diamines.

There is a need for high refractive index materials that also have good transparencies over a wide range of wavelengths, good solubilities in acceptable solvents, high molecular weights, and the ability to form films of at least 5 microns thick by spin coating or casting from solution.

SUMMARY OF THE INVENTION

The present invention is broadly concerned with new high refractive index compositions and methods of using those compositions.

In more detail, the compositions comprise a polymer dispersed or dissolved in a solvent system. The polymer includes recurring monomers having a formula selected from the group consisting of

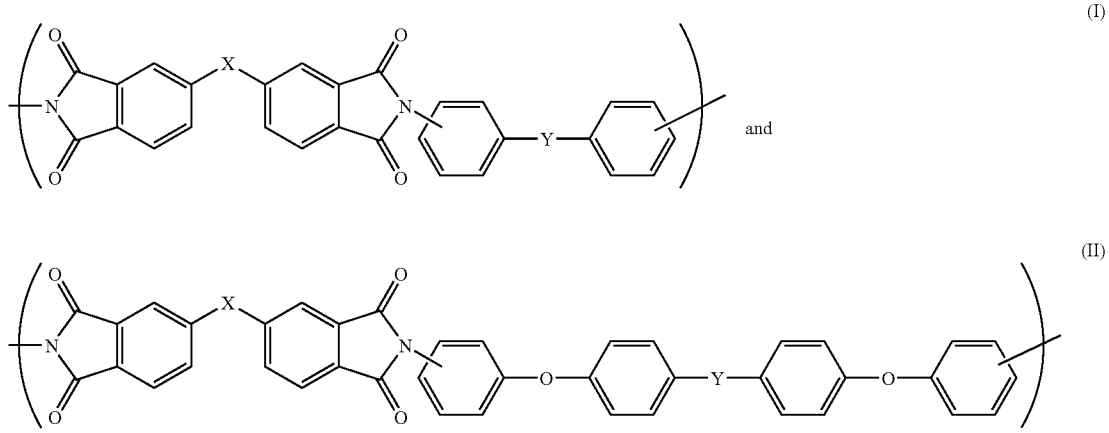

In (I) and (II), each X is independently selected from the group consisting of polarizable atoms (e.g., oxygen atoms, sulfur atoms), —SO$_2$—, and

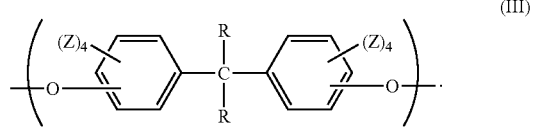

In (III), each R and Z is individually selected from the group consisting of hydrogen atoms, halogen atoms, alkyls (preferably C$_1$–C$_{12}$, and more preferably C$_1$–C$_6$), and haloalkyls (preferably C$_1$–C$_{12}$, and more preferably C$_1$–C$_6$). Preferred haloalkyls include those selected from the group consisting of fluoroalkyls, bromoalkyls, and chloroalkyls.

In (I) and (II), each Y is individually selected from the group consisting of polarizable atoms and groups selected from the group consisting of sulfonyl, sulfonylbis(4,4'-phenyleneoxy), alkylphosphino (preferably C$_1$–C$_{12}$, and more preferably C$_1$–C$_6$), arylphosphino, imidazolyl, benzoyl, fluorenyl, carbazolyl, naphthyl, arylphosphoryl (preferably C$_6$–C$_{18}$, and more preferably C$_6$–C$_{12}$), alkylphosphoryl (preferably C$_1$–C$_{12}$, and more preferably C$_1$–C$_6$), and (III). The most preferred polarizable atoms are those selected from the group consisting of oxygen, sulfur, phosphorus, and selenium. As used herein, "polarizable atoms" refers to those atoms that can be polarized by radiation having a wavelength of from about 400–700 nm.

The most preferred polymers include recurring monomers selected from the group consisting of The solvent system should have a boiling point of from about 65–210° C., and preferably from about 80–150° C. The amount of polymer dissolved in the solvent system is from about 1–40% by weight polymer, and more preferably from about 5–25% by weight polymer, based upon the total weight of the composition taken as 100% by weight.

The solvent system should be utilized at a level of at least about 50% by weight, preferably from about 60–99% by weight, and more preferably from about 75–95% by weight, based upon the total weight of the composition taken as 100% by weight. Preferred solvent systems include a solvent selected from the group consisting of tetrahydrofurfuryl alcohol, N-methylpyrrolidone, dimethylformamide, dimethylacetamide, cyclopentanone, γ-butyrolactone, dimethylsulfoxide, cyclohexanone, tetrahydrofuran, chloroform, dichloromethane, mono- and dichlorobenzene, and mixtures thereof.

The inventive compositions may also include an ingredient selected from the group consisting of surfactants (e.g., fluorinated surfactants such as FC4430, available from 3M), adhesion promoters (e.g., silanes, glycidyl silanes) metal oxide nanoparticles (e.g., TiO$_2$, ZrO$_2$, Ta$_2$O$_5$), and mixtures thereof.

The method of using the compositions simply comprises applying a quantity of a composition hereof to a surface by any conventional application method (including spin coating) to form a layer thereon. Exemplary substrates include those selected from the group consisting of glass, quartz, silicon, sapphire, gallium arsenide, silicon carbide, and plastic (e.g., polycarbonate, PMMA) substrates. Optionally,

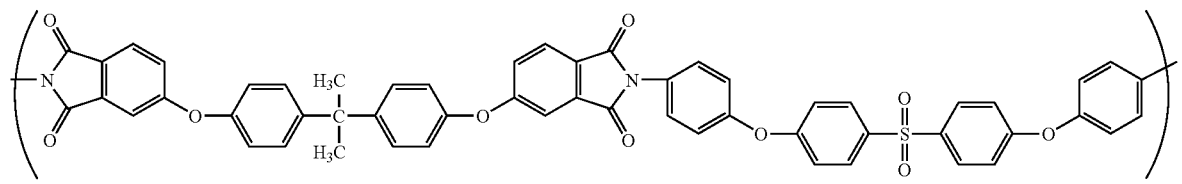

and

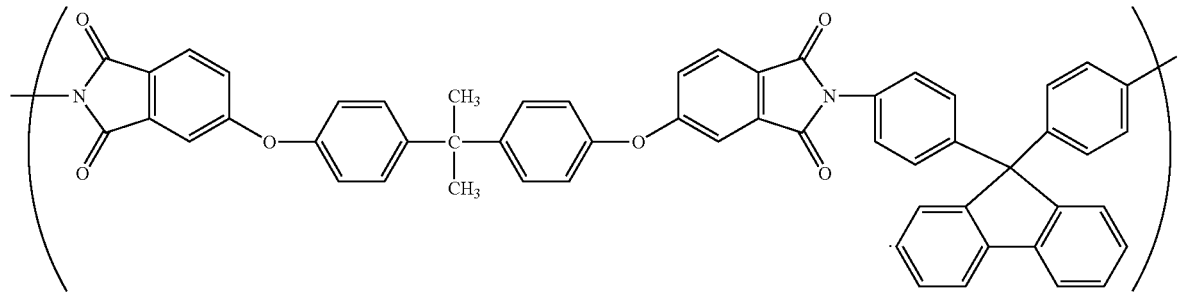

The weight average molecular weight of this polymer is preferably from about 30,000–180,000 Daltons, and more preferably from about 50,000–100,000 Daltons.

The inventive compositions generally have an overall solids content of from about 1–50% and can be prepared by simply dissolving or dispersing the polymer (and any other ingredients as discussed below) in a suitable solvent system.

other layers (e.g., adhesion promoting layers) can be applied to the substrate prior to application of the inventive composition to the substrate.

The layer is then baked at temperatures of from about 60–250° C., and preferably from about 80–150° C. for a time period of from about 2–120 minutes, and preferably from about 2–10 minutes. It will be appreciated that this step results in substantial removal (at least about 97%, preferably at least about 99%, and more preferably about 100%) of the solvent from the layer. Thus, the baked layer will include less than about 1% by weight solvent, preferably less than about 0.5% by weight solvent, and even more preferably 0% by weight solvent, based upon the total weight of the composition taken as 100% by weight. At the same time, however, very little (less than about 1%) or no crosslinking of the polymer occurs, resulting in a layer of the polyimide polymer on the substrate. The layers produced by this method will typically have a thickness after baking of from about 1–30 μm, however, multiple applications can be carried out to increase the thickness.

The baked layers according to the invention exhibit highly desirable properties. For example, they have high refractive indices and light transmission values. At wavelengths of from about 400–700 nm, a 5-μm thick layer will have a refractive index of at least about 1.60, preferably from about 1.60–1.95, and more preferably from about 1.70–1.85. At wavelengths of from about 700–1700 nm, the refractive index will be at least about 1.50, and more preferably from about 1.50–1.65. At wavelengths of from about 400–700 nm, a 5-μm thick layer will have a % transmission of at least about 65%, preferably at least about 80%, and more preferably at least about 90%. The baked layers will also have these % transmissions at wavelengths of about 1310 nm and about 1550 nm, making them useful in telecommunications applications as well.

Furthermore, the inventive high refractive index layers are more soluble in conventional solvents when compared to prior art layers. That is, the baked layers are at least about 10% by weight, and preferably at least about 15% by weight soluble when exposed to solvents selected from the group consisting of cyclohexanone, cyclopentanone, dimethylacetamide, γ-butyrolactone, and mixtures thereof.

The baked layers also possess good thermal and oxidative stabilities. When subjected to a thermogravimetric analysis (TGA), the layers will experience a less than about 10%, and preferably less than about 5% weight loss when heated at 400° C. for a time period of about 2 minutes. Furthermore, when subjected to TGA in nitrogen and to TGA in air, the percent weight loss in air will be within about 5%, and preferably within about 1%, of the percent weight loss in nitrogen.

The structure comprising the baked layer on the substrate can then be subjected to further processing steps, depending upon the intended use. For example, other layers can be applied on top of the high refractive index layer. For example, a protective layer can be applied to the high refractive index layer so that structure can be built.

The inventive high refractive index layer is useful in a wide number of areas where high refractive indices are important. Exemplary areas include virtual displays, LED devices, optical storage cover layers, and devices using diffraction gratings.

Figure 1:
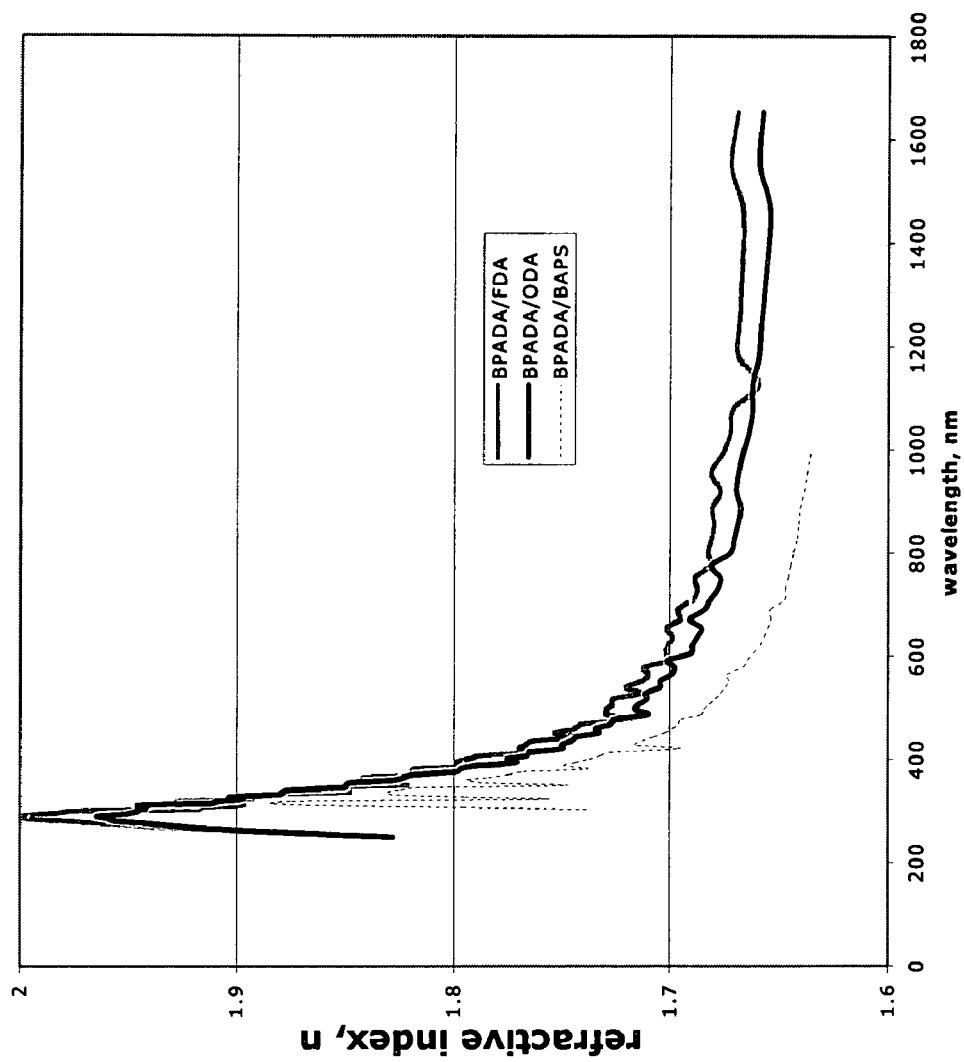
FIG. 1 is a graph depicting the respective refractive indices at varying wavelengths of three polyimide compositions (Examples 1–3) according to the present invention.

DETAILED DESCRIPTION OF THE PREFERRED EMBODIMENTS PREFERRED POLYIMIDE PREPARATION PROCESS

Polyimides are typically formed by the reaction of a dianhydride with diamine, usually in equimolar amounts, thus forming a poly(amic acid) intermediate that is then made to undergo a cyclodehydration reaction (either chemically or thermally) to form the polyimide. Polyimides can also be formed directly via a one-step process that involves heating the dianhydride (preferably aromatic) and diamine (preferably para- or meta-linked and aromatic) in m-cresol in the presence of catalytic amounts of isoquinoline.

Suitable diamines include 4,4'-oxydianiline, 4,4'-diaminodiphenylsulfone, 3,3'-diaminodiphenylsulfone, 2,2-bis[4-(4-aminophenoxy)phenyl]-sulfone, 2,2-bis[4-(3-aminophenoxy)phenyl]-sulfone, and 9,9-bis(4-aminophenyl)fluorine. Other diamines that incorporate large polarizable atoms such as sulfur or phosphorus, or functional groups such as sulfonyl, phosphoranyl, or carbazolyl may also be utilized as monomers. The dianhydride preferably an arylether substructure in the backbone (e.g., 4,4'-bisphenol A dianhydride).

The polyimides are preferentially synthesized by first generating the poly(amic acid) in a solvent such dimethylformamide (DMF), dimethylacetamide (DMAc), dimethylsulfoxide (DMSO), cyclopentanone, cyclohexanone, diglyme, N-methylpyrrolidone (NMP), or suitable mixtures thereof. Thermal imidization is then carried out in solution, with the use of an azeotroping solvent, such as toluene or o-dichlorobenzene, in order to distill off the water that is generated. Solution polymerization and imidization may also be done with a one-step method involving the use of m-cresol and a catalytic amount of isoquinoline and heating to 200° C. The polyimide that is formed is then purified by precipitation into a suitable non-solvent such as methanol, and then dried in a vacuum oven to remove residual solvents. Alternatively, solution chemical imidization, such as with the use of excess amounts of a tertiary amine such as pyridine or triethylamine, and acetic anhydride may also be used to prepare the polyimides from the poly(amic acid) solutions. Other methods of polyimide synthesis, such as by utilizing a poly(ester-acid) intermediate (Durimide product information from Arch Micro) may also be applied in the preparation of these high refractive index polymers.

EXAMPLES

The following examples set forth preferred methods in accordance with the invention. It is to be understood, however, that these examples are provided by way of illustration and nothing therein should be taken as a limitation on the overall scope of the invention.

Example 1

High Refractive Index Poly(etherimidesulfone) Composition

In this procedure, 20.77 g (0.04803 mol) of bis[4-(4-aminophenoxy)phenoxy]sulfone (BAPS, obtained from ChrisKev) were charged into a 500-mL, 4-necked flask equipped with an addition funnel with nitrogen inlet, a mechanical stirrer, a condenser with attached nitrogen outlet, and a temperature probe. Nitrogen gas was passed through the system, and the system was kept under nitrogen for the duration of the synthesis. The BAPS was dissolved by adding 102.53 g of dimethylacetamide (DMAc, obtained from Aldrich) and stirring. In a separate flask, 25.00 g (0.04803 mol) of bisphenol A dianhydride (BPADA, obtained from ChrisKev) were dissolved by adding 120.13 g DMAc and stirring. The BPADA solution was transferred into the addition funnel and slowly added to the stirring BAPS solution. After the addition was finished, 38.12 g more of DMAc was added to bring the total solids level to 14.93%. The resulting solution was stirred at room temperature for 24 hours.

Next, 50 mL of toluene (obtained from Aldrich) was added to the viscous light yellow solution, and a Dean-Stark tube was attached to the flask. The solution temperature was slowly raised to 160° C. and was maintained there for 24 hours. The resulting solution was cooled to room temperature and precipitated into 600 mL of stirring methanol (obtained from Spectrum) to give a white, stringy precipitate. The precipitate was washed with an additional 100 mL of methanol and dried for 24 hours in an 80° C. vacuum oven.

The obtained polyimide had a molecular weight of 76,300 Daltons. A 7.42-micron film of this material had a transmission of 86% to 100% from 400 to 700 nm. The refractive index ranged from 1.64 to 1.74 in the visible region.

Example 2

A High Refractive Index Poly(etherimide) Composition

In this example, 16.74 g (0.04803 mol) 9,9-diphenylaminofluorene (FDA, obtained from Aldrich) were charged into a 500-mL 4-necked flask equipped with an addition funnel with nitrogen inlet, a mechanical stirrer, a condenser with attached nitrogen outlet, and a temperature probe. Nitrogen gas was passed through the system, and the system was kept under nitrogen for the duration of the synthesis. The FDA was dissolved by adding 112.28 g of N-methylpyrrolidone (NMP, obtained from Aldrich) and stirring. In a separate flask, 25.00 g (0.04803 mol) of BPADA was dissolved by adding 125.19 g NMP and stirring. The BPADA solution was then transferred into the addition funnel and slowly added to the stirring FDA solution. The resulting solution was stirred at room temperature for 24 hours after which 70 mL of toluene was added in to the viscous, light yellow solution, and a Dean-Stark tube was attached to the flask. The solution temperature was slowly raised to 170° C. and was maintained there for 24 hours. The resulting solution was cooled to room temperature and precipitated into 600 mL of stirring methanol to give a white, stringy precipitate. The precipitate was washed with an additional 100 mL of methanol and dried for 24 hours in an 80° C. vacuum oven.

The obtained polyimide had a molecular weight of 69,500 Daltons. Analysis showed that the refractive index ranged from 1.68 to 1.78 in the visible region.

Example 3

A Mixed Diamine Poly(etherimide sulfone)

This procedure was carried out by dissolving 2.63 g (0.0131 moles) of 4,4'oxydianiline (4,4'-ODA, obtained from ChrisKev) in 45 g of NMP in a 2-necked 250-mL flask equipped with an addition funnel, a condenser with nitrogen bubbler, and a magnetic stir bar. Next, 5.69 g (0.0132 mol) BAPS was added to this solution, and the resulting mixture was dissolved by stirring. The procedure was continued by dissolving 13.70 g BPADA into 75.54 g NMP, and this solution was added to the stirred diamine solution under nitrogen. Stirring was continued for 24 hours. A Dean-Stark trap was attached to the flask, and 25 mL of toluene was added to the solution. The temperature was slowly brought to 170° C., and after two hours, 25 mL of toluene was added. The temperature was kept at 170° C. for 24 hours, and then the flask was allowed to cool to room temperature. The solution was precipitated in 500 mL of stirred methanol (Spectrum) and dried in a vacuum oven overnight at 50° C.

Example 4

Spin Coating Application Method

The polyimide (BPADA/BAPS) prepared in Example 1 was dissolved in cyclopentanone to form a 16% (w/w) solution. The solution was filtered through a 0.45-micron filter and bottled. A 4-inch silicon wafer was treated with a 0.5% (w/w) solution of N-[3-(trimethoxysilyl)propyl]-ethylenediamine (obtained from Gelest) in 9:1 propylene glycol methyl ether/water (w/w), spin-coated at 2,000 rpm for 60 seconds, and baked on a 112° C. hotplate for 60 seconds. Approximately 2 mL of the BPADA/BAPS solution was taken using a disposable pipette and applied to the pretreated silicon wafer. The solution was spun onto the wafer at 1,000 rpm (ramp rate: 500 rpm/s) for 10 seconds. It was allowed to stand for 10 seconds and spun at 1,000 rpm (ramp rate: 1,000 rpm/s) for 80 seconds. The wafer was then baked at 100° C. for 90 seconds, and at 205° C. for 90 seconds. The result was a coating having a thickness of 8.168 microns as measured by a KLA Tencor profilometer.

Example 5

Refractive Index Determination

The polyimide coatings of Examples 1–3 were spin-coated on silicon wafers by a procedure similar to that described in Example 4. Spin speeds were adjusted to obtain thicknesses of less than 1 micron. Refractive index values were obtained using a variable angle spectroscopic ellipsometer (J. A. Woollam) at a wavelength of 633 nm (see FIG. 1).

Example 6

Ultraviolet/Visible/Near-Infrared (UV-vis-NIR) Transmission Spectrum

Figure 2:
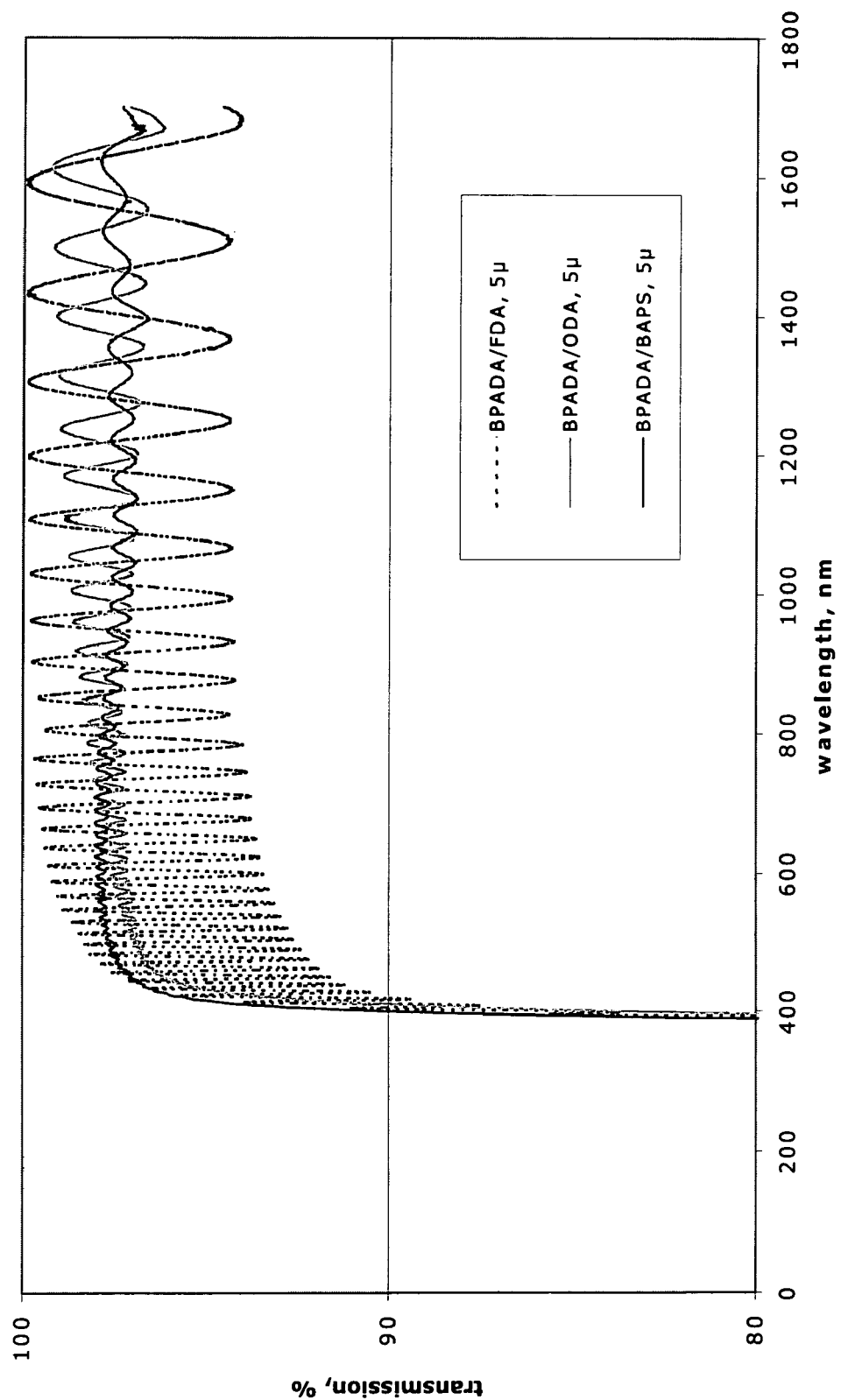
FIG. 2 is a graph depicting the respective transmission curves at varying wavelengths of three polyimide compositions (Examples 1–3) according to the present invention.

Polyimide coatings of Examples 1–3 were spin-coated on 3-inch quartz disks by a procedure similar to that described in Example 4. Spin speeds were adjusted to obtain thicknesses of 5 microns or greater. Transmission spectra were obtained using a UV-vis-NIR spectrophotometer (Varian) without corrections for scattering or reflective losses (see FIG. 2).

Example 7

High Refractive Index Poly(etherimidesulfone) Composition

Bis[4-(3-aminophenoxy)phenoxy]sulfone (15.00 g (0.03468 mol); m-BAPS; obtained from ChrisKev) was charged into a 250-mL 3-necked flask equipped with an addition funnel with nitrogen inlet, a magnetic stir bar, a condenser with attached nitrogen outlet, and a temperature probe. Nitrogen gas was passed through the system, and the system was kept under nitrogen for the duration of the synthesis. The BAPS was dissolved by adding 93.50 g of DMAc and stirring. In a separate beaker, 18.05 g (0.03468 mol) of BPADA was dissolved by adding 93.50 g DMAc and stirring while covered tightly with parafilm.

The BPADA solution was transferred into the addition funnel and slowly added to the stirring m-BAPS solution over a period of 10 minutes. The resulting solution was stirred at room temperature for 24 hours. A Dean-Stark tube was attached to the flask, and the solution temperature was slowly raised to 80° C. Next, 50 mL of toluene was added to the viscous, light yellow solution. The solution temperature was slowly raised to 160° C. and was maintained there for 35 hours. The resulting solution was cooled to room temperature and precipitated into 600 mL of stirring methanol to give white, pellet-like solids. The solids were washed with an additional 100 mL of methanol and dried for 16 hours in an 50° C. vacuum oven to yield a yellow solid.

The obtained poly(etherimidesulfone) was dissolved in enough cyclopentanone to yield a 20% by weight solids solution. An 8.15-micron film of this material had a transmission of 91.8–100% in the region of from 400 to 700 nm. The refractive index ranged from 1.67–1.77 in the visible region.

We claim:

1. In a composition useful in the fabrication of optoelectronic devices, said composition comprising a polymer dispersed in a solvent system, the improvement being that said polymer comprises recurring monomers having a formula selected from the group consisting of

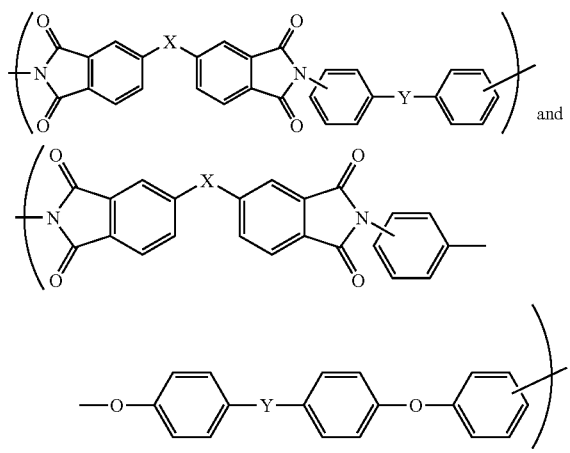

wherein:

each X is

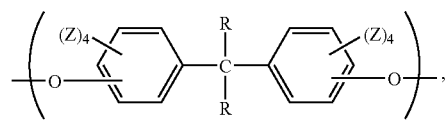

where each R and Z is individually selected from the group consisting of hydrogen atoms, halogen atoms, alkyis, and haloalkyls; and each Y is individually selected from the group consisting of polarizable atoms and groups selected from the group consisting of sulfonyl, sulfonylbis(4,4'-phenyleneoxy), alkyiphosphino, arylphosphino, imidazolyl, benzoyl, fluorenyl, carbazolyl, naphthyl, arylphosphoryl, alkylphosphoryl, and

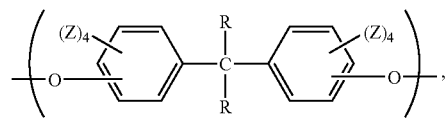

where each Rand Z is individually selected from the group consisting of hydrogen atoms, halogen atoms, alkyls, and haloalkyls.

2. The composition of claim 1, wherein said solvent system is present in said composition at a level of at least about 50%, based upon the total weight of the composition taken as 100% by weight.

3. The composition of claim 1, wherein said solvent system comprises a solvent selected from the group consisting of tetrahydrofurfuryl alcohol, N-methylpyrrolidone, dimethylformamide, dimethylacetamide, cyclopentanone, Y-butyrolactone, dimethylsulfoxide, cyclohexanone, tetrahydrofuran, chloroform, dichloromethane, mono- and dichlorobenzene, and mixtures thereof.

4. The composition of claim 1, wherein said polymer comprises recurring monomers having a formal selected from the group consisting of.

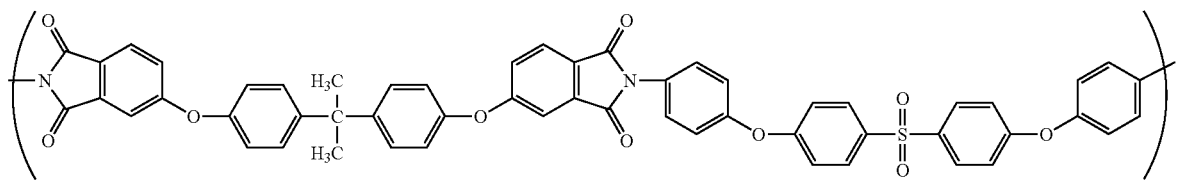

and

-continued

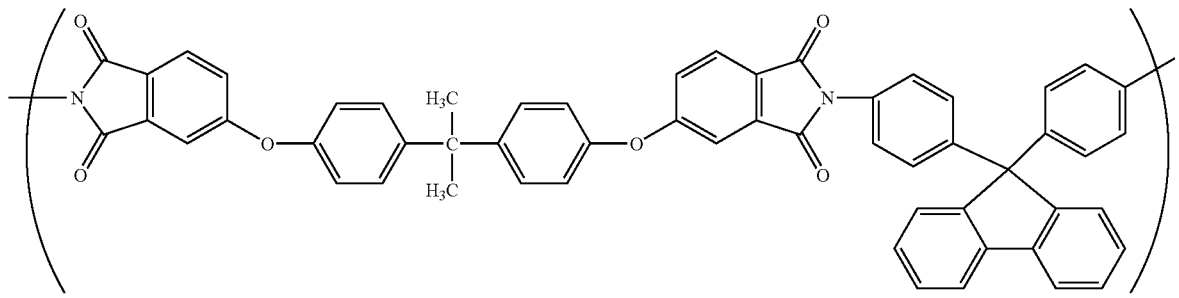

5. The composition of claim 1, wherein said polymer has a weight average molecular weight of from about 30,000–180,000 Daltons.

6. The composition of claim 1, said composition further comprising an ingredient selected from the group consisting of surfactants, adhesion promoters, metal oxide nanoparticles, and mixtures thereof.

7. The composition of claim 1, wherein said composition comprises from about 1–40% by weight of said polymer, based upon the total weight of the composition taken as 100% by weight.

8. A method of forming a precursor structure for use in optoelectronic applications, said method comprising the steps of:
providing a substrate having a surface; and
applying a high refractive index layer to said substrate surface, said high refractive index layer being formed from a composition comprising a polymer dissolved in a solvent system, said polymer recurring monomers having a formula selected from the group consisting of

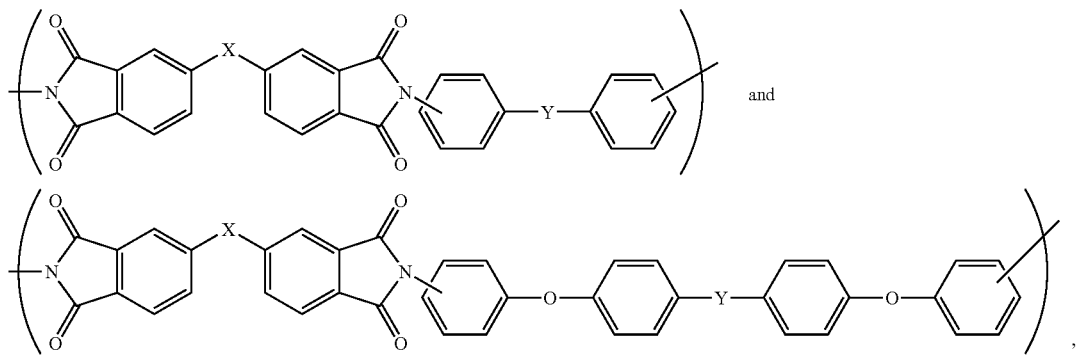

wherein:
each X is

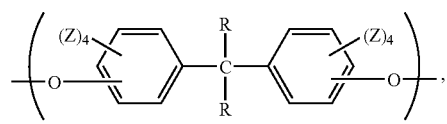

where each R and Z is individually selected from the group consisting of hydrogen atoms, halogen atoms, alkyls, and haloalkyls; and each Y is individually selected from the group consisting of polarizable atoms and groups selected from the group consisting of sulfonyl, sulfonylbis (4,4'-phenyleneoxy), alkylphosphino, arylphosphino, imidazolyl, benzoyl, fluorenyl, carbazolyl, naphthyl, arylphosphoryl, alkylphosphoryl, and

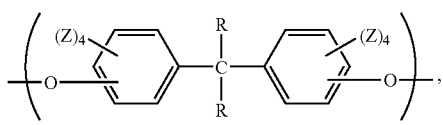

where each R and Z is individually selected from the group consisting of hydrogen atoms, halogen atoms, alkyls, and haloalkyls.

9. The method of claim 8, wherein said solvent system is present in said composition at a level of at least about 50%, based upon the total weight of the composition taken as 100% by weight.

10. The method of claim 8, wherein said solvent system comprises a solvent selected from the group consisting of tetrahydrofurfuryl alcohol, N-methylpyrrolidone, dimethylformamide, dimethylacetamide, cyclopentanone, Υ-butyrolactone, dimethylsulfoxide, cyclohexanone, tetrahydrofuran, chloroform, dichloromethane, mono- and dichlorobenzene, and mixtures thereof.

11. The method of claim 8, wherein said polymer comprises recurring monomers having a formula selected from the group consisting of

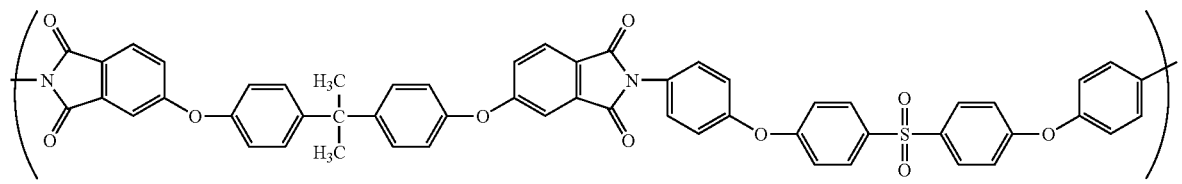

and

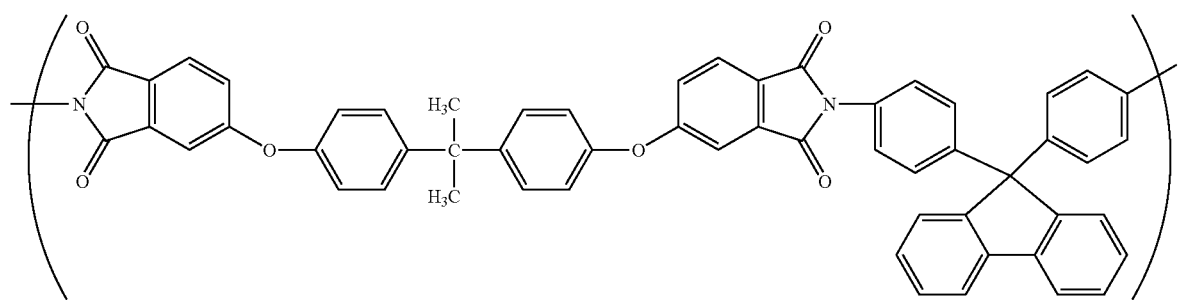

12. The method of claim 8, wherein said polymer has a weight average molecular weight of from about 30,000–180,000 Daltons.

13. The method of claim 8, said composition further comprising an ingredient selected from the group consisting of surfactants, adhesion promoters, and metal oxide nanoparticles.

14. The method of claim 8, wherein said composition comprises from about 1–40% by weight of said polymer, based upon the total weight of the composition taken as 100% by weight.

15. The method of claim 8, further comprising the step of applying an intermediate layer to said substrate surface prior to said high refractive index layer applying step.

16. The method of claim 15, wherein said intermediate layer is an adhesion promoting layer.

17. The method of claim 8, further comprising the step of applying a protective layer on said high refractive index layer.

18. The method of claim 8, further comprising the step of baking said high refractive index layer.

19. The method of claim 18, wherein said baking step comprises subjecting said high refractive index layer to a temperature of from about 60–250° C. for a time period of from about 2–120 minutes.

20. The method of claim 18, wherein said baking step yields a high refractive index layer that is essentially non-crosslinked.

21. The method of claim 18, wherein said baked high refractive index layer has a thickness of from about 1–30 μm.

22. The method of claim 18, wherein said baked high refractive index layer has a refractive index of at least about 1.50 at wavelengths of from about 700–700 nm and at a thickness of about 5 μm.

23. The method of claim 18, wherein said baked high refractive index layer has a transmission of at least about 65% at wavelengths of from about 400–700 μm and at a thickness of about 5 μm.

24. The method of claim 18, wherein said baked high refractive index layer is at least about 10% by weight soluble in a solvent selected from the group consisting of cyclohexanone, cyclopentanone, dimethylacetamide, Y-butyrolactone, and mixtures thereof.

25. The method of claim 18, wherein said baked high refractive index layer exhibits a weight loss of less than about 10% by weight when heated at about 400° C. for a time period of about 2 minutes.

26. The method of claim 18, wherein said baked high refractive index layer has a percent weight loss when heated in a nitrogen atmosphere and a percent weight loss when heated in air, the percent weight loss in air being within about 5% of the percent weight loss in nitrogen.

27. The method of claim 8, wherein said substrate is selected from the group consisting of glass, quartz, silicon, sapphire, gallium arsenide, silicon carbide, and plastic substrates.

28. The method of claim 8, wherein said applying step comprises spin coating said high refractive index layer onto said substrate surface.

29. The combination of:
a substrate having a surface; and
a high refractive index layer adjacent said surface, said layer comprising a polymer having a formula selected from the group consisting of

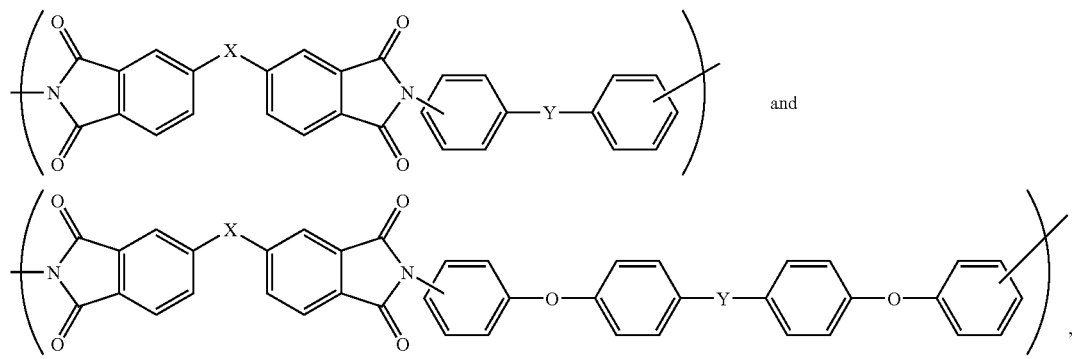

and wherein:
each X is

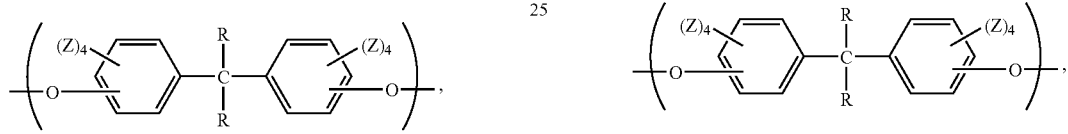

where each R and Z is individually selected from the group consisting of hydrogen atoms, halogen atoms, alkyls, and haloalkyls; and each Y is individually selected from the group consisting of polarizable atoms and groups selected from the group consisting of sulfonyl, sulfonylbis (4,4'-phenyl eneoxy), alkyiphosphino, arylphosphino, imidazolyl, benzoyl, fluorenyl, carbazolyl, naphthyl, arylphosphoryl, alkylphosphoryl, and

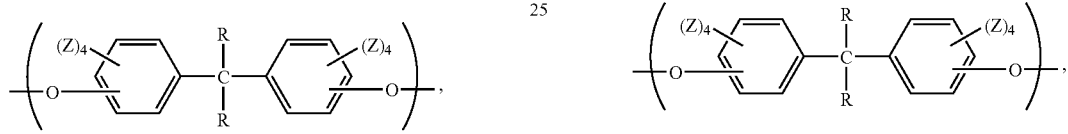

where each R and Z is individually selected from the group consisting of hydrogen atoms, halogen atoms, alkyls, and haloalkyls.

30. The combination of claim 29, wherein said polymer comprises recurring monomers having a formula selected from the group consisting of.

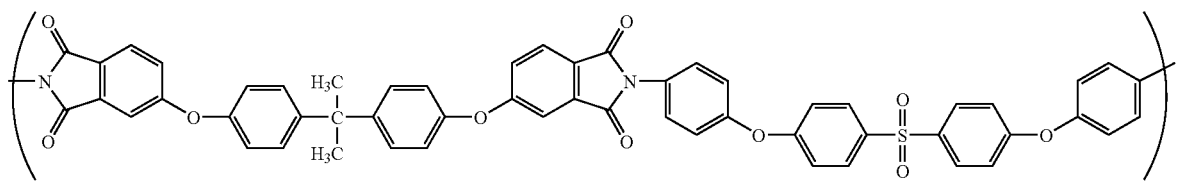

and

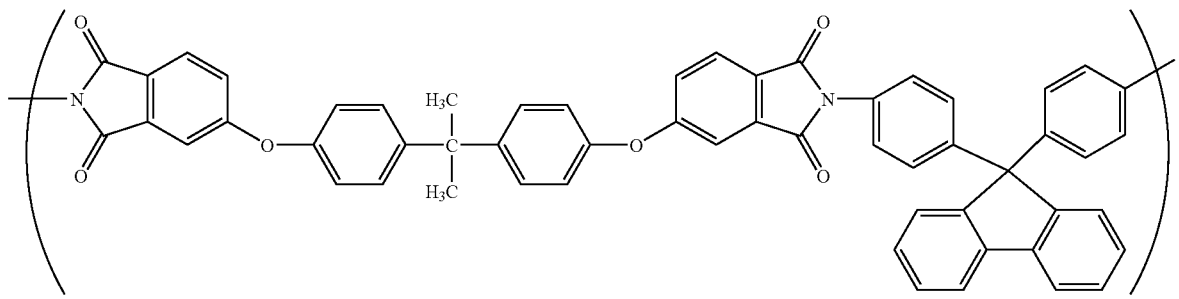

31. The combination of claim 29, wherein said polymer has an average molecular weight of from about 30,000–180,000 Daltons.

32. The combination of claim 29, said layer farther comprising an ingredient selected from the group consisting of surfactants, adhesion promoters, and metal oxide nanoparticles.

33. The combination of claim 29, further comprising an intermediate layer between said substrate surface and said high refractive index layer.

34. The combination of claim 33, wherein said intermediate layer is an adhesion promoting layer.

35. The combination of claim 29, wherein said high refractive index layer is essentially noncrosslinked.

36. The combination of claim 29, wherein said high refractive index layer has a thickness of from about 1–30 µm.

37. The combination of claim 29, wherein said high refractive index layer has a refractive index of at least about 1.50 at wavelengths of from about 700–1700 nm and at a thickness of about 5 µm.

38. The combination of claim 29, wherein said high refractive index layer has a transmission of at least about 65% at wavelengths of from about 400–700 nm and at a thickness of about 5 µm.

39. The combination of claim 29, wherein said high refractive index layer is at least about 10% by weight soluble in a solvent selected from the group consisting of cyclohexanone, cyclopentanone, dimethylacetamide, Y-butyrolactone, and mixtures thereof.

40. The combination of claim 29, wherein said high refractive index layer exhibits a weight loss of less than about 10% by weight when heated at about 400° C. for a time period of about 2 minutes.

41. The combination of claim 29, wherein said high refractive index layer has a percent weight loss when heated in a nitrogen atmosphere and a percent weight loss when heated in air, the percent weight loss in air being within about 5% of the percent weight loss in nitrogen.

42. The combination of claim 29, wherein said substrate is selected from the group consisting of glass, quartz, silicon, sapphire, gallium arsenide, silicon carbide, and plastic substrates.

43. The combination of claim 29, wherein said layer comprises less than about 1% by weight solvent.

44. In a composition useful in the fabrication of optoelectronic devices, said composition comprising a polymer dispersed in a solvent system, the improvement being that said polymer comprises recurring monomers having a formula selected from the group consisting of

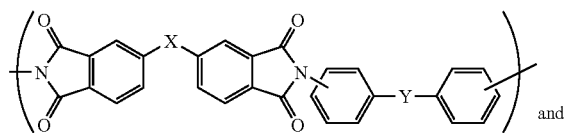 and

-continued

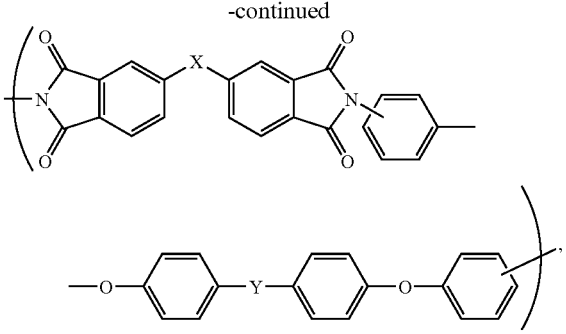

wherein:
each X is independently selected from the group consisting of polarizable atoms, —SO$_2$—, and

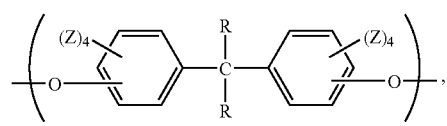

where each R and Z is individually selected from the group consisting of hydrogen atoms, halogen atoms, alkyls, and haloalkyls; and each Y is individually selected from the group consisting of sulfonylbis(4,4'-phenyleneoxy), alkyiphosphino, alkyiphosphino, imidazolyl, benzoyl, fluorenyl, carbazolyl, naphthyl, arylphosphoryl, alkylphosphoryl, and

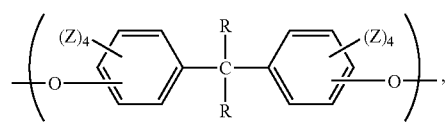

where each R and Z is individually selected from the group consisting of hydrogen atoms, halogen atoms, alkyls, and haloalkyls.

45. A method of forming a precursor structure for use in optoelectronic applications, said method comprising the steps of:
providing a substrate having a surface; and
applying a high refractive index layer to said substrate surface, said high refractive index layer being formed from a composition comprising a polymer dissolved in a solvent system, said polymer recurring monomers having a formula selected from the group consisting of

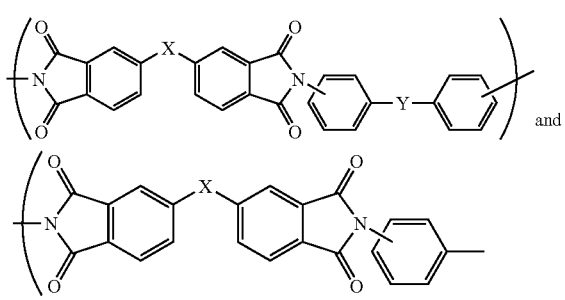

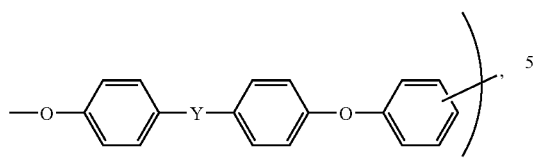

wherein:
  each X is independently selected from the group consisting of polarizable atoms, —SO₂—, and

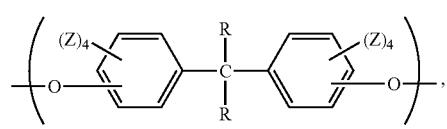

where each R and Z is individually selected from the group consisting of hydrogen atoms, halogen atoms, alkyls, and haloalkyls; and
  each Y is individually selected from the group consisting of sulfonylbis(4,4'-phenyleneoxy), alkylphosphino, arylphosphino, imidazolyl, benzoyl, fluorenyl, carbazolyl, naphthyl, arylphosphoryl, alkylphosphoryl, and

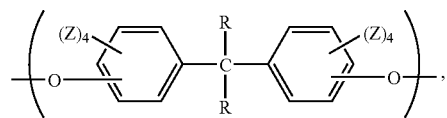

where each R and Z is individually selected from the group consisting of hydrogen atoms, halogen atoms, alkyls, and haloalkyls.

46. The method of claim 45 wherein said substrate is selected from the group consisting of glass, quartz, silicon, sapphire, gallium arsenide, silicon carbide, and plastic substrates.

47. The combination of:
  a substrate having a surface; and
  a high refractive index layer adjacent said surface, said layer comprising a polymer having a formula selected from the group consisting of

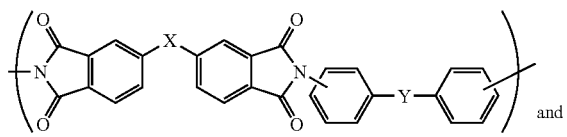

and

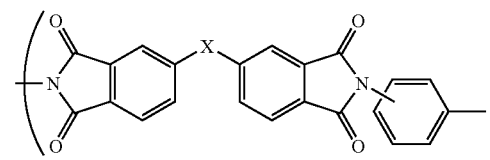

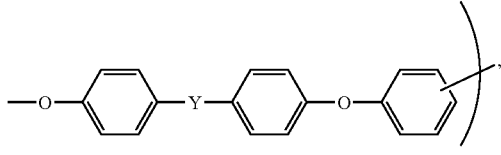

wherein:
  each X is independently selected from the group consisting of polarizable atoms, —SO₂—, and

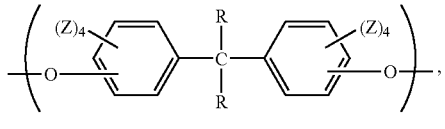

where each R and Z is individually selected from the group consisting of hydrogen atoms, halogen atoms, alkyls. and haloalkyls; and
  each Y is individually selected from the group consisting of sulfonylbis(4,4'-phenyleneoxy), alkylphosphino, arylphosphino, imidazolyl, benzoyl, fluorenyl, carbazolyl, naphthyl, arylphosphoryl, alkylphosphoryl, and

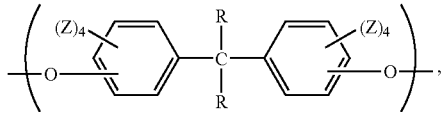

where each R and Z is individually selected from the group consisting of hydrogen atoms, halogen atoms, alkyls, and haloalkyls.

48. The combination of claim 47, wherein said substrate is selected from the group consisting of glass, quartz, silicon, sapphire, gallium arsenide, silicon carbide, and plastic substrates.

49. A method of forming a precursor structure for use in optoelectronic applications, said method comprising the steps of:
  providing a substrate having a surface;
  applying an adhesion promoting layer to said substrate surface; and
  applying a high refractive index layer to said adhesion promoting layer, said high refractive index layer being formed from a composition comprising a polymer dissolved in a solvent system, said polymer recurring monomers having a formula selected from the group consisting of

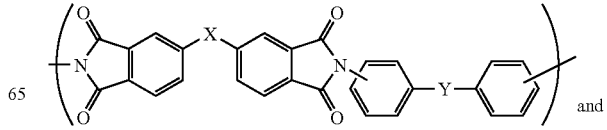

and

-continued

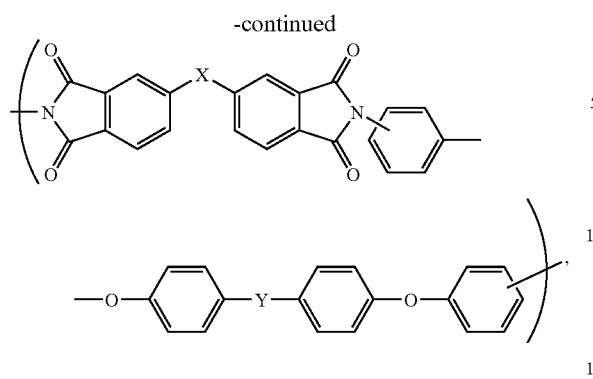

wherein:
each X is independently selected from the group consisting of polarizable atoms, —SO$_2$—, and

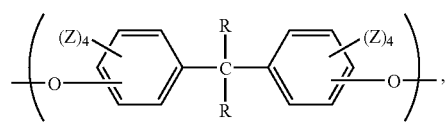

where each R and Z is individually selected from the group consisting of hydrogen atoms, halogen atoms, alkyls, and haloalkyls; and
each Y is individually selected from the group consisting of polarizable atoms and groups selected from the group consisting of sulfonyl, sulfonylbis (4,4'-phenyleneoxy), alkyiphosphino, arylphosphino, imidazolyl, benzoyl, fluorenyl, carbazolyl, naphthyl, arylphosphoryl, alkylphosphoryl, and

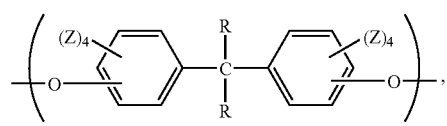

where each R and Z is individually selected from the group consisting of hydrogen atoms, halogen atoms, alkyls, and haloalkyls.

50. A method of forming a precursor structure for use in optoelectronic applications, said method comprising the steps of:
providing a substrate having a surface;
applying a high refractive index layer to said substrate surface, said high refractive index layer being formed from a composition comprising a polymer dissolved in a solvent system, side polymer recurring monomers having a formula selected from the group consisting of

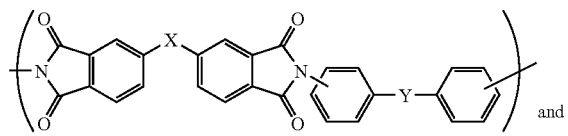 and

-continued

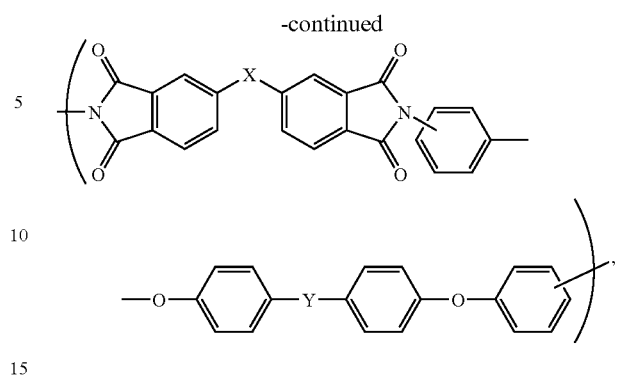

wherein:
each X is independently selected from the group consisting of polarizable atoms, —SO$_2$—, and

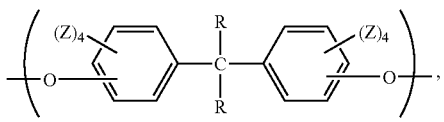

where each R and Z is individually selected from the group consisting of hydrogen atoms, halogen atoms, alkyls, and haloalkyls; and
each Y is individually selected from the group consisting of polarizable atoms and groups selected from the group consisting of sulfonyl, sulfonylbis (4,4'-phenyleneoxy), alkylphosphino, alkylphosphino, imidazolyl, benzoyl, fluorenyl, carbazolyl, naphthyl, arylphosphoryl, alkylphosphoryl, and

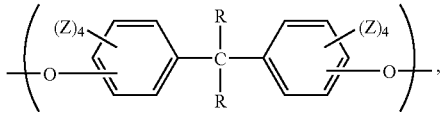

where each R and Z is individually selected from the group consisting of hydrogen atoms, halogen atoms, alkyls, and haloalkyls; and
applying a protective layer on said high refractive index layer.

51. The combination of:
a substrate having a surface;
an adhesion promoting layer adjacent said substrate surface; and
a high refractive index layer adjacent said adhesion promoting layer, said high refractive index layer comprising a polymer having a formula selected from the group consisting of

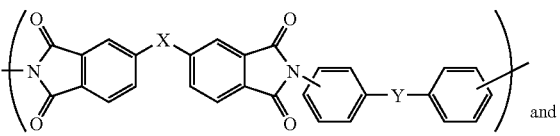 and

-continued

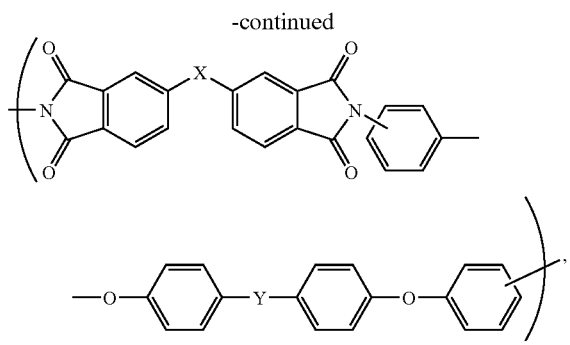

wherein:

each X is independently selected from the group consisting of polarizable atoms, —SO$_2$—, and

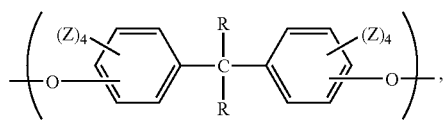

where each R and Z is individually selected from the group consisting of hydrogen atoms, halogen atoms, alkyls, and halo alkyls; and each Y is individually selected from the group consisting of polarizable atoms and groups selected from the group consisting of sulfonyl, sulfonylbis(4,4'-phenyleneoxy), alkyiphosphino, arylphosphino, imidazolyl, benzoyl, fluorenyl, carbazolyl, naphthyl, arylphosphoryl, alkylphosphoryl, and

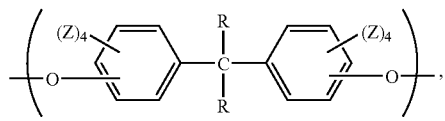

where each R and Z is individually selected from the group consisting of hydrogen atoms, halogen atoms, alkyls, and haloalkyls.

52. The combination of:

a substrate having a surface;

a high refractive index layer adjacent said adhesion promoting layer, said high refractive index layer comprising a polymer having a formula selected from the group consisting of

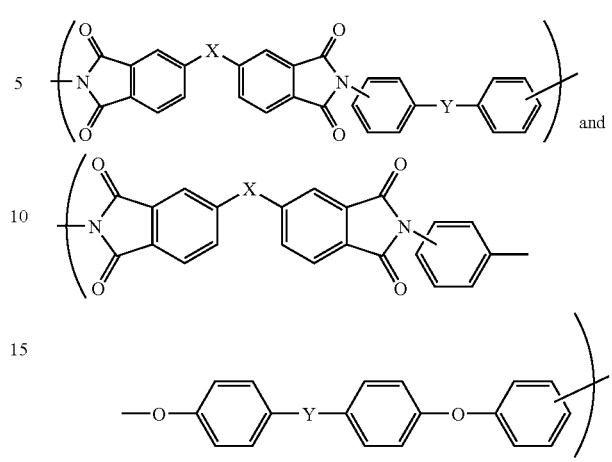

wherein:

each X is independently selected from the group consisting of polarizable atoms, —SO$_2$—, and

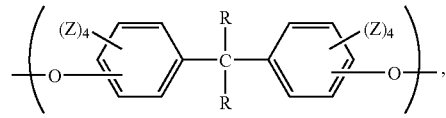

where each R and Z is individually selected from the group consisting of hydrogen atoms, halogen atoms, alkyls, and haloalkyls; and each Y is individually selected from the group consisting of polarizable atoms and groups selected from the group consisting of sulfonyl, sulfonylbis(4,4'-phenyleneoxy), alkylphosphino, arylphosphino, imidazolyl, benzoyl, fluorenyl, carbazolyl, naphthyl, aiylphosphoiyl, alkylphosphoryl, and

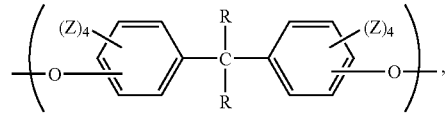

where each R and Z is individually selected from the group consisting of hydrogen atoms, halogen atoms, alkyls, and haloalkyls; and a protective layer adjacent said high refractive index layer.

* * * * *